United States Patent [19]
Pike

[11] Patent Number: 5,804,278
[45] Date of Patent: Sep. 8, 1998

[54] LAMINATED PANEL CONSTRUCTION WITH HONEYCOMB GRID CORE

[75] Inventor: Richard S. Pike, Kansas City, Mo.

[73] Assignee: Fixtures Manufacturing Corporation, Kansas City, Mo.

[21] Appl. No.: 775,975

[22] Filed: Jan. 3, 1997

[51] Int. Cl.⁶ ........................................................ B32B 3/12
[52] U.S. Cl. ............................................... 428/116; 428/192
[58] Field of Search ........................................ 428/116, 192

[56] References Cited

U.S. PATENT DOCUMENTS

| | | | |
|---|---|---|---|
| 412,507 | 8/1889 | Hurford | 52/788.1 |
| 2,039,601 | 5/1936 | London | 52/479 |
| 2,545,805 | 3/1951 | Callender | 156/197 X |
| 2,669,860 | 2/1954 | Bell | 52/793.1 X |
| 2,833,001 | 5/1958 | Montefalco | 52/783.1 X |
| 2,911,274 | 11/1959 | Grube | 428/73 X |
| 3,223,056 | 12/1965 | Wilburn | 52/782.2 X |
| 3,229,433 | 1/1966 | Miles | 428/464 X |
| 3,450,593 | 6/1969 | Fossier et al. | 428/116 X |
| 3,600,257 | 8/1971 | Reinhardt | 428/118 |
| 3,676,279 | 7/1972 | Beaver | 428/73 |
| 3,709,161 | 1/1973 | Kauffman | 428/116 X |
| 4,061,812 | 12/1977 | Gilwee, Jr. et al. | 428/117 |
| 4,084,366 | 4/1978 | Saylor et al. | 428/116 X |
| 4,143,501 | 3/1979 | Tuttle | 52/793.1 X |
| 4,291,079 | 9/1981 | Hom | 428/116 |
| 4,421,811 | 12/1983 | Rose et al. | 428/116 |
| 4,465,725 | 8/1984 | Riel | 428/116 |
| 4,689,257 | 8/1987 | Baum | 428/116 X |
| 4,749,601 | 6/1988 | Hillinger | 428/116 X |
| 4,796,397 | 1/1989 | Capaul | 428/116 X |
| 4,807,411 | 2/1989 | Capaul | 428/116 X |
| 4,971,849 | 11/1990 | Azzar | 428/192 X |
| 4,973,506 | 11/1990 | Bauer et al. | 428/116 X |
| 5,022,943 | 6/1991 | Zaima | 428/116 X |
| 5,041,323 | 8/1991 | Rose et al. | 428/116 |
| 5,061,514 | 10/1991 | Gertel | 428/116 |
| 5,106,668 | 4/1992 | Turner | 428/116 |
| 5,182,158 | 1/1993 | Schaeffer | 428/116 X |
| 5,460,864 | 10/1995 | Heitkamp | 428/116 |
| 5,460,865 | 10/1995 | Tsotsis | 428/116 |

*Primary Examiner*—Henry F. Epstein
*Attorney, Agent, or Firm*—Litman, McMahon & Brown, L.L.C.

[57] ABSTRACT

A composite panel construction suitable for use in furniture, and particularly for uses such as table, desk and cabinet tops includes, in a first embodiment, a single honeycomb layer sandwiched between a pair of plywood layers, with the honeycomb layer preferably made of polystyrene or a similar polymeric material. In a second embodiment, a composite panel includes a single plywood core with upper and lower honeycomb layers attached above and below the single plywood core. The plywood layers in both embodiments provide resistance to screw pull-out such that screws can be threaded into the panel from any desired position on the bottom of the panel and the exposed edges of the plywood layer(s) provide adequate surfaces for the attachment of decorative edging material to the panel.

3 Claims, 5 Drawing Sheets

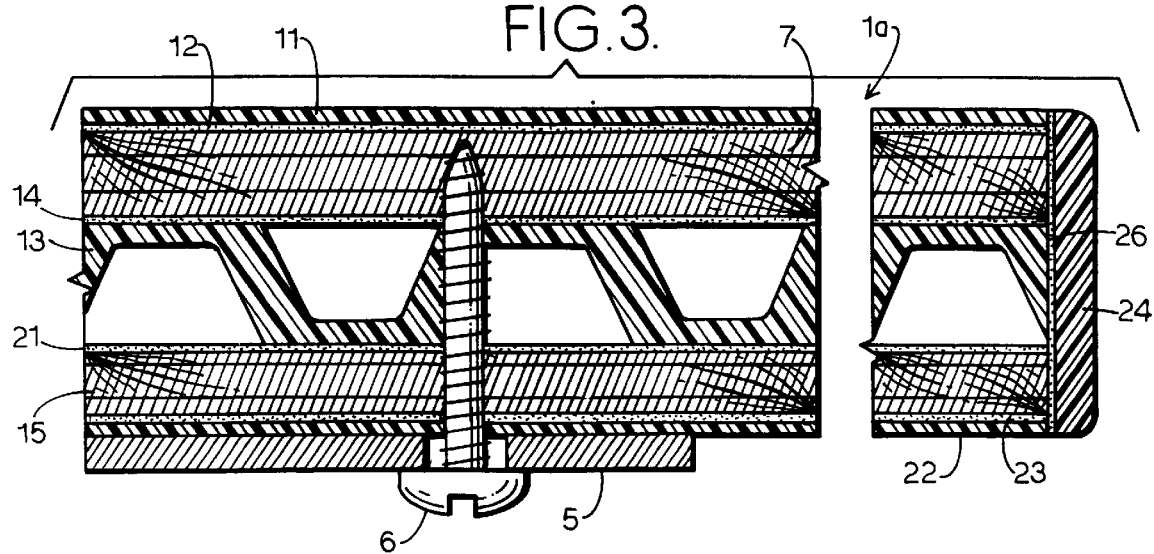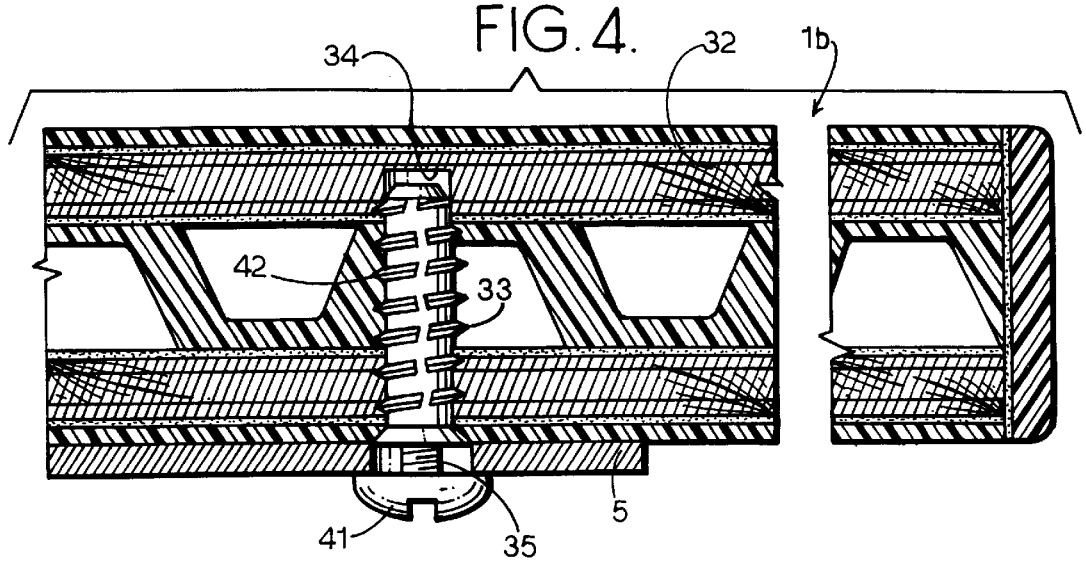

LAMINATED PANEL CONSTRUCTION WITH HONEYCOMB GRID CORE

FIELD OF THE INVENTION

The present invention relates to a panel construction, and, more particularly, to such a panel construction in which, in a first embodiment, a laminated structure including upper and lower plywood layers are attached to respective sides of a single honeycomb core layer with a decorative veneer attached atop the first plywood layer and a protective veneer attached beneath the lower plywood layer and, in a second embodiment, a laminated structure including upper and lower honeycomb layers attached to respective sides of a plywood core layer, with a decorative veneer attached atop the upper honeycomb layer and a protective veneer attached beneath the lower honeycomb layer.

BACKGROUND OF THE INVENTION

Designers and manufacturers of furniture are constantly seeking manufacturing methods and materials which are light weight, but strong. As traditional materials such as solid wood panels become more scarce and more expensive, and with increasing emphasis on environmental concerns, it is important that furniture components be made of materials which are environmentally acceptable, i.e. so-called "green" materials and/or recycled materials. Finally, particularly in the case of cabinet top or table top panel construction, it is important that the material making up the panels be capable of accepting screws or threaded inserts anywhere on the underneath surface of these panels.

One well known type of furniture panel construction includes the use of some type of honeycomb structure sandwiched between two or more solid sheets. There have been many prior attempts to make a satisfactory honeycomb panel. One example is described and illustrated in U.S. Pat. No. 2,911,274 to K. P. Grube and entitled DESK TOP CONSTRUCTION. This patent teaches upper and lower metal sheets which are positioned on either side of a paper honeycomb layer, with a synthetic rubber adhesive used to attach the metal sheets to the honeycomb layer. The resulting laminated desk top is then equipped with threaded bores held in position behind the bottom metal sheet via spreading shoulders. Thus, during construction of the desk, placement of attachment screws from beneath the desk top is restricted to the threaded bore positions. Edges are formed by overlapping the metal sheets and an edge strip is attached to the overlapped sheets via a sheet metal screw.

Another example of prior art honeycomb construction is taught in U.S. Pat. No. 3,676,279 to Beaver and entitled SANDWICH TOP CONSTRUCTION FOR OFFICE FURNITURE. In this patent, a bottom plate is formed as a tray with a perimeter upstanding wall. A honeycomb insert is received within the perimeter wall and a flat top plate is positioned over the honeycomb insert, with both top and bottom plate being covered with an adhesive coating. Perimeter decorative materials can then be screwed into the perimeter wall.

Both the Beaver and Grube patents use metal sheets on either side of the honeycomb insert, which greatly adds to the expense and weight of the composite panels. This is particularly true if the metal sheets are sufficiently thick to accept and hold sheet metal screws or fasteners for the attachment of table legs, etc. Conversely, when thinner metal sheets are used, then spreading anchors must be prepositioned to accept machine screws or other fasteners.

It is clear, then that a need exists for a light weight, durable, strong and attractive honeycomb panel construction suitable for use as table, desk and cabinet tops, etc. Such a panel construction should preferably incorporate at least one honeycomb layer to minimize weight, but the panel should also be sufficiently resistant to screw pull-out such that support screws and other fasteners can be used therein without the need for spreading threaded anchors.

SUMMARY OF THE INVENTION

The present invention is drawn to a composite panel construction suitable for use in furniture, and particularly for uses such as table, desk and cabinet tops. In a first embodiment of the invention, a plywood panel is sandwiched between a pair of honeycomb layers, each of which can be made of polystyrene or a similar polymer, cardboard or other suitable materials. A decorative veneer is attached to the upper surface of the top honeycomb layer and a protective veneer is attached to the bottom surface of the bottom honeycomb layer. The plywood panel provides resistance to screw pull-out such that screws can be threaded into the panel from any desired position on the bottom of the panel. The centered plywood panel also provides edge surfaces which are suitable for the placement of anchor bores such that a decorative edge strip can be installed via spreading anchors positioned in corresponding ones of the anchor bores.

In a first embodiment, a composite panel includes a single honeycomb core which can be made from polystyrene or a similar polymer, recycled cardboard, wood fiber, or other suitable materials. An upper material sheet is formed from a laminate comprising an upper plywood sheet glued to a decorative veneer top layer, with the upper plywood sheet glued onto the top surface of the honeycomb core. A lower plywood panel is glued onto the bottom surface of the honeycomb core and the lower plywood sheet has a protective veneer attached to the bottom surface thereof. In the first embodiment, the two plywood panels provide adequate screw pull-out resistance such that wood screws can be used anywhere on the bottom of the panel, particularly when screws are used which are long enough to penetrate the lower plywood layer, continue through the honeycomb layer and enter the upper plywood layer.

In a second embodiment of the invention, a plywood core layer is sandwiched between upper and lower honeycomb layers, each of which can be made of recycled cardboard or other suitable materials, polystyrene or a similar polymer. A decorative veneer is attached to the upper surface of the upper honeycomb layer and a protective veneer is attached to the bottom surface of the lower honeycomb layer. The plywood core layer provides resistance to screw pull-out such that screws can be threaded into the panel from any desired position on the bottom of the panel. The centered plywood panel also provides edge surfaces which are suitable for the placement of slots such that T molded decorative edge strips can be installed via tangs on the T mold inserted into the slots. In either embodiment, exposed edges of the plywood layer or layers alternatively provide a gluing surface for adhering a decorative plastic edging to the laminated panel.

OBJECTS AND ADVANTAGES OF THE INVENTION

The objects and advantages of the present invention include: providing an improved laminated panel construction for furniture applications; providing such an improved panel construction which includes at least one honeycomb layer; providing such a panel which also includes at least one plywood layer attached to the honeycomb layer; providing such a panel construction in which resistance to screw pull-out is sufficient to allow threaded attachment screws to be inserted at any desired position on the underneath side of the panel; providing such a panel construction which provides a peripheral edge which allows for the attachment of decorative edge strips by gluing or by tangs in T molded edging; providing such a panel construction which is light weight, yet very strong; and providing such a panel construction which is relatively simple, economical to manufacture, yet is versatile, durable and is particularly well suited to its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is a fragmentary, cross-sectional view of a portion of the panel of FIG. 2, taken along line 3—3 of FIG. 2, and illustrating a threaded wood screw positioned directly into the panel to attach a support structure beneath the panel.

FIG. 4 is a fragmentary, cross-sectional view of a portion of the panel of FIG. 2, again taken along line 3—3 of FIG. 2, and showing a variation in laminate thickness and with a threaded anchor positioned directly into the panel and with a machine screw attaching a support structure beneath the panel via the threaded anchor.

DETAILED DESCRIPTION OF THE INVENTION

Figure 1:
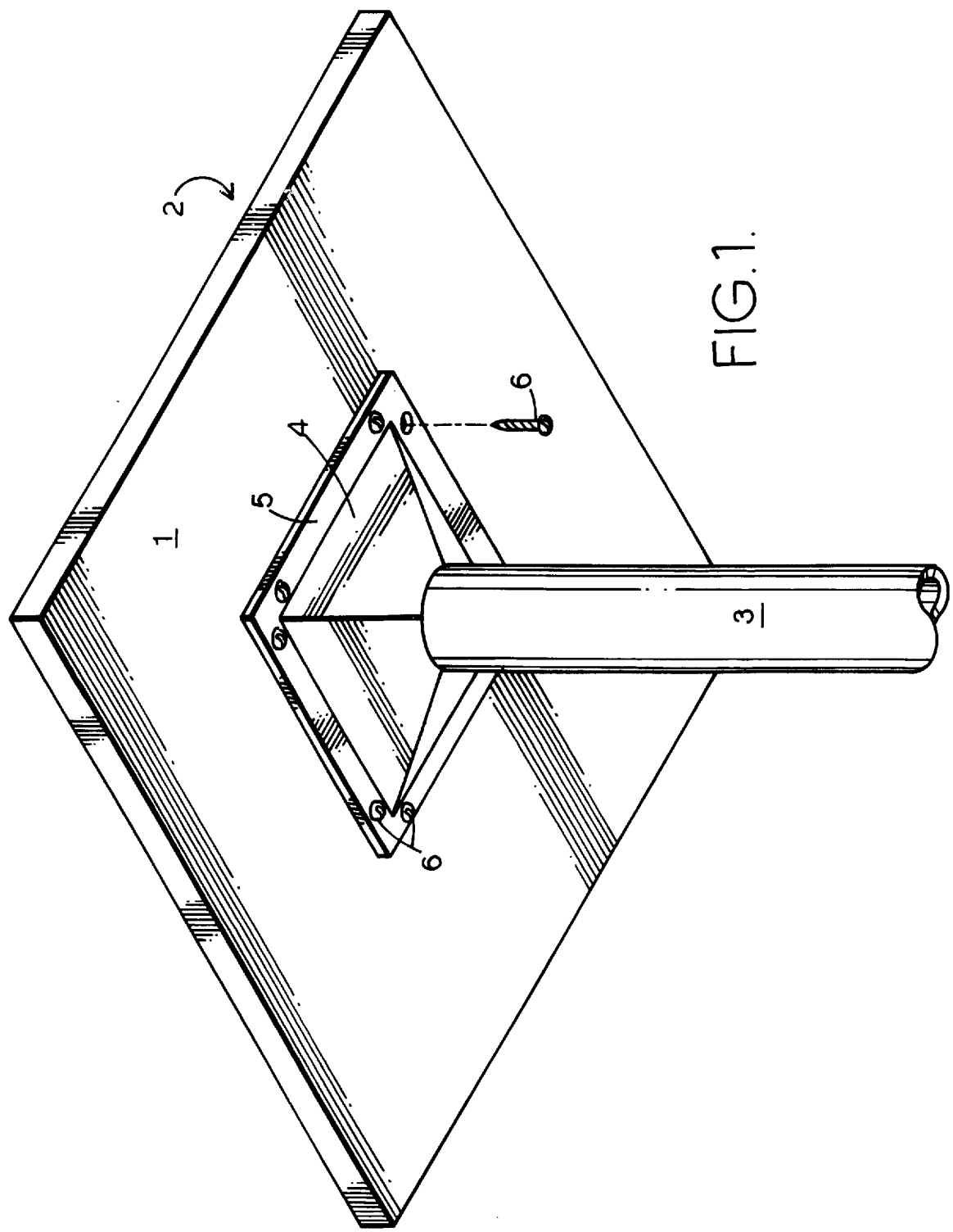
FIG. 1 is a perspective view of a table which includes, as a table top, the inventive laminated panel construction, with supporting structure attached via screws threaded directly into the bottom of the table top.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawing figures, the inventive laminated panel, generally indicated at 1, is shown serving as a top of a table 2. A supporting structure including a pipe column 3 with a supporting bracket 4 and a perimeter attachment flange 5 is shown attached to the underneath side of the panel 1 via screws 6 which are threaded directly into the bottom surface of the panel 1.

Figure 2:
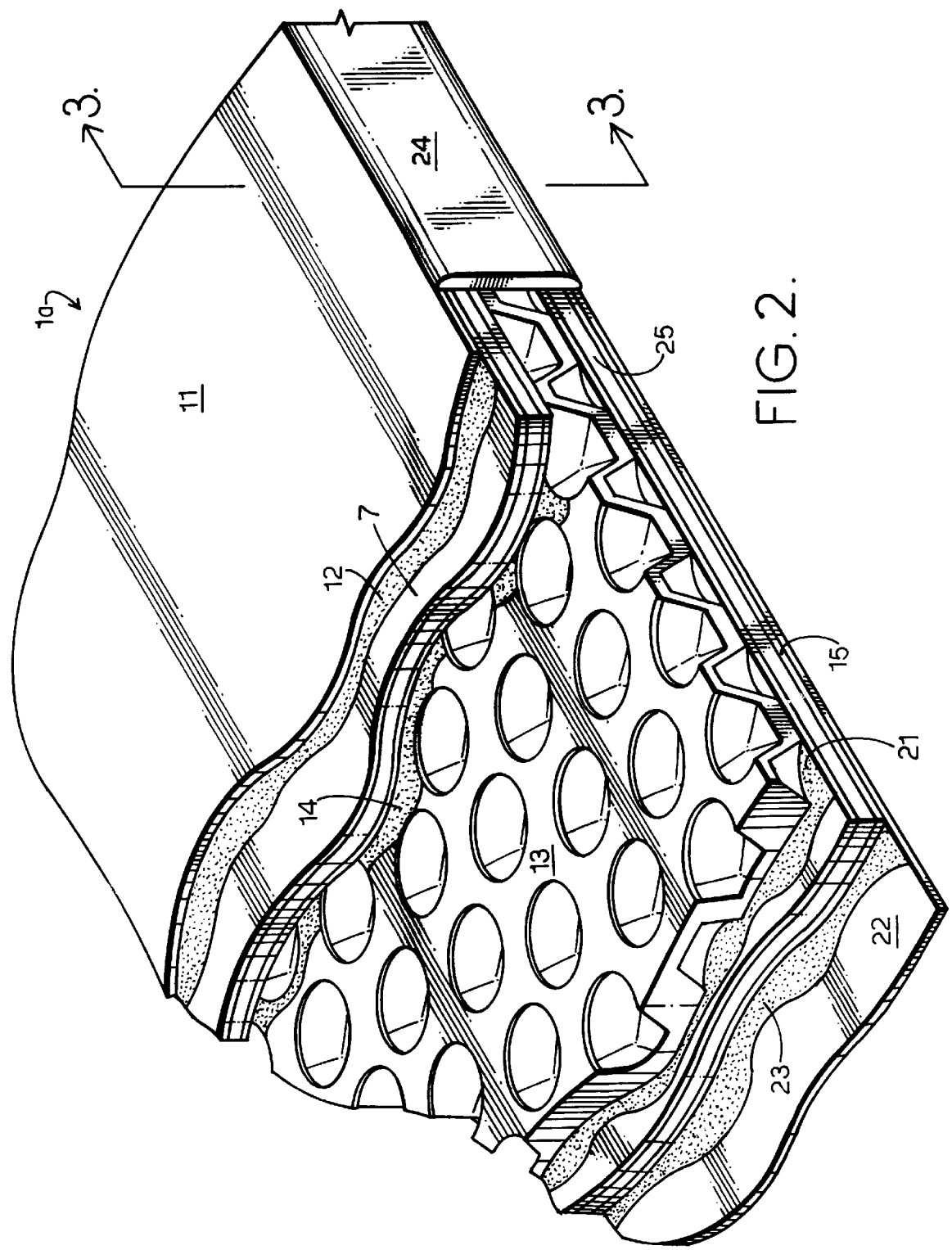
FIG. 2 is a fragmentary, perspective view of a portion of a first embodiment of a laminated panel, with portions of several laminated layers broken away to illustrate the panel construction.

A first embodiment of laminate construction suitable for the panel 1 is illustrated in FIGS. 2 and 3, where the panel is designated as 1a. The panel 1a includes an upper plywood layer 7, with a top decorative veneer 11 attached thereto via an adhesive 12. A core honeycomb layer 13 is attached to the bottom side of the upper plywood layer 7 via an adhesive layer 14 and a lower plywood layer 15 is attached to the bottom side of the honeycomb layer 13 via an adhesive layer 21. A bottom protective veneer 22 is attached to the bottom side of the second plywood layer 15 via an adhesive layer 23. A decorative and protective edge strip 24 is attached to the exposed edges 25 of the panel 1a via an adhesive layer 26. In one embodiment of the panel 1a, the upper plywood layer 7 is approximately ⅜ inch thick, the lower plywood layer 15 is approximately ¼ inches thick and the honeycomb layer 13 was approximately ½ inches thick, thus making the overall depth of the panel 1a approximately 1 and ⅛ inches.

FIG. 3 illustrates the panel 1a being attached to a support flange 5 via a threaded wood screw 6 which screw 6 is of sufficient length to penetrate the lower plywood layer 15, the honeycomb layer 13 and substantially into the upper plywood layer 7. This is one of the major advantages of the inventive panel construction 1a since the dual plywood layers 7 and 13 provide sufficient resistance to screw pull-out that the screws 6 can be located virtually anywhere on the bottom side of the panel 1a.

FIG. 4 illustrates a slight variation of panel construction 1b wherein an upper plywood layer 32 is ¼ inch thick instead of ⅜". The panel 1b is otherwise substantially identical to the panel 1a of FIG. 3. Instead of utilizing threaded wood screws 6, as shown in FIG. 3, threaded anchors 33 are inserted into respective bores 34 placed into the panel 1b from the bottom thereof. The anchors 33 have internal threads 35 for accommodating suitable machine screws 41 extending through the flange 5 and an external flighting of threads 42 which serve to retain the anchors 33 within the walls of the bores 34.

Figure 5:
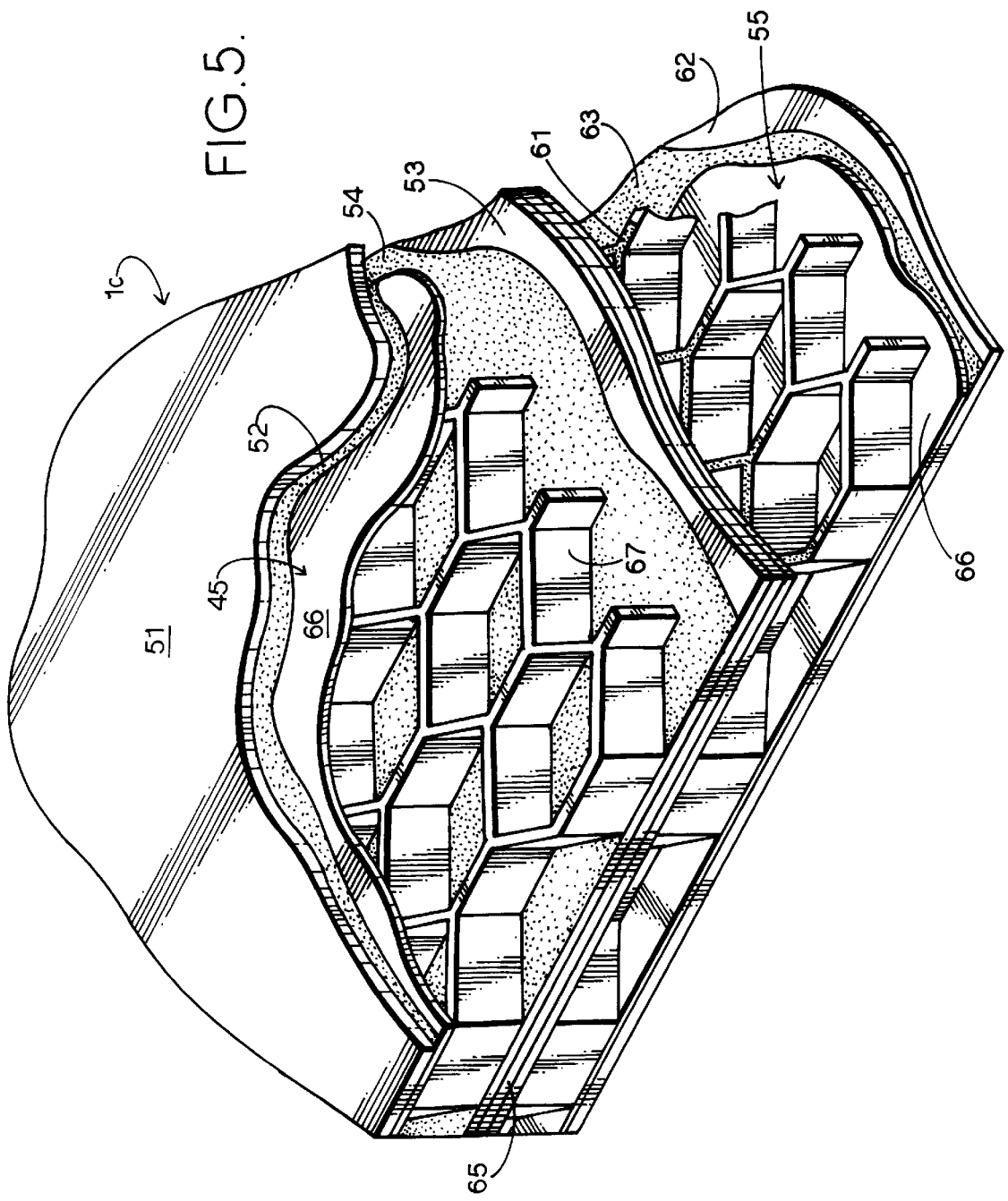
FIG. 5 is a fragmentary, perspective view of a portion of a second embodiment of a laminated panel, with portions of several laminated layers broken away to illustrate the panel construction.
Figure 6:
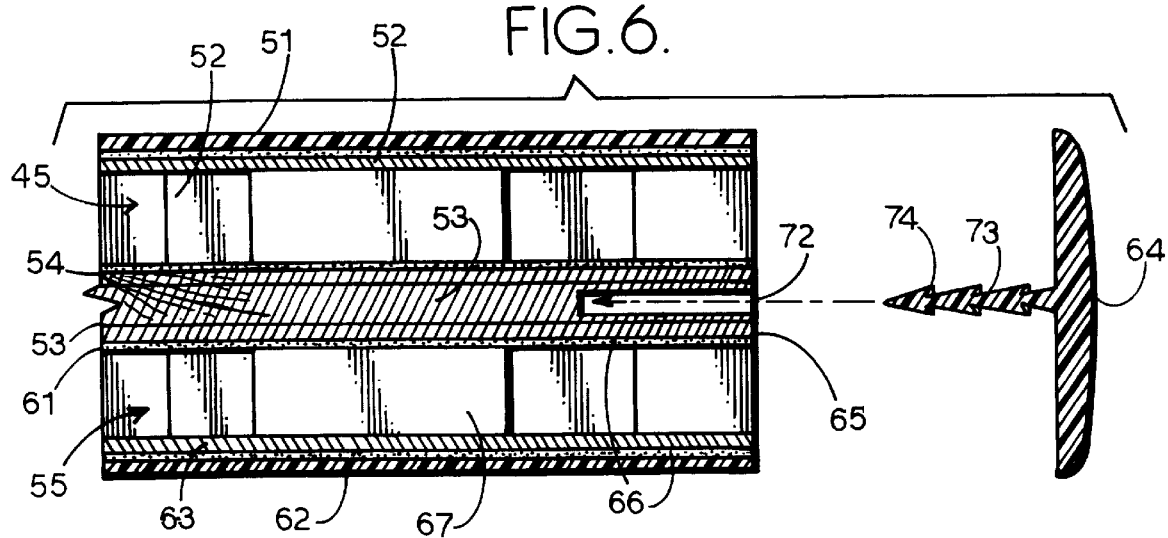
FIG. 6 is a fragmentary, cross-sectional view of a portion of the panel of FIG. 5, taken along line 6—6 of FIG. 5, and illustrating a T molded decorative edge strip positioned for attachment into a receiving slot in a plywood core layer of the panel.
Figure 7:
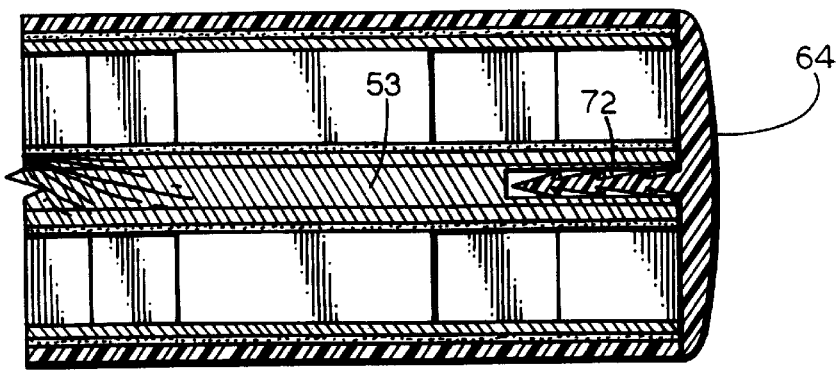
FIG. 7 is a fragmentary, cross-sectional view of a portion of the panel of FIG. 5, again taken along line 6—6 of FIG. 5, and illustrating the T molded decorative edge strip anchored into the receiving slot in the plywood core layer.

FIGS. 5–7 illustrate a third embodiment of panel construction, generally indicated as 1c. The panel 1c includes an upper honeycomb layer 45 with a top decorative veneer 51 attached thereto via an adhesive 52. A core plywood layer 53 is attached to the bottom side of the upper honeycomb layer 45 via an adhesive layer 54 and a second honeycomb layer 55 is attached to the bottom side of the plywood layer 53 via an adhesive layer 61. Finally, a bottom protective veneer 62 is attached to the bottom side of the second honeycomb layer 55 via an adhesive layer 63. A decorative and protective T molded edge strip 64 (FIGS. 6 and 7) is attached to the exposed edges 65 of the panel 1c, as explained below. Each of the honeycomb layers 45 and 55 is an integral construction consisting of a paper layer 66 on one side of a honeycombed wood fiber core 67. In one embodiment of the panel 1a, the plywood layer 53 is approximately ⅜ inches thick (nominal thickness) and each of the honeycomb layers 45 and 55 is also approximately ⅜ inches thick, making the overall depth of the panel 1a approximately 1 and ⅛ inches.

FIG. 6 illustrates the T molded edge strip 64 positioned to be inserted into a receiving slot 72 formed in the peripheral edge of the plywood core layer 53. The edge strip 64 is conventional, and includes a protruding tang on prong 73 which includes a number of teeth 74 which are angled back toward the strip 64 to resist pull-out of the tang 73 once it is inserted into the slot 72 in the plywood layer 53, as shown in FIG. 7. This is an advantage of the third embodiment of panel 1c since the central placement of the plywood layer 53 allows the use of conventional T shaped edge strips 64, and the plywood layer 53 still provides adequate resistance to screw pull-out for threaded wood screws 6 and/or threaded anchors 33 (not shown).

In one example of the panels 1a and 1b, the honeycomb layer 13 is a plastic layer manufactured by Norfield Corporation of Danbury, Conn. and marketed under the trade mark NORCORE. In one example of the panel 1c, the honeycomb layers 45 and 55 are a product made of recycled corrugated cardboard manufactured by Gridcore Systems International of Long Beach, Calif. and sold under the trademark GRIDCORE. A suitable adhesive for the panel 1c is polyvinyl acetate, a common wood fiber adhesive. For the panels 1a and 1b and of a number of adhesives which bond plastic to wood fiber are suitable.

A major advantage of the panel embodiments 1a and 1b as well as the panel embodiment 1c is the reduction in weight over typical particle board core panels. While a typical particle board core panel of equivalent thickness typically weighs approximately 5lbs per square foot, the inventive panels 1a, 1b, and 1c weigh approximately 2.75 pounds per square foot, a reduction in weight of close to 50%. With the inventive panel construction, this weight reduction is accomplished with no reduction in strength.

It is to be understood that while certain forms of the present invention have been illustrated and described herein, it is not to be limited to the specific forms or arrangement of parts described and shown.

What is claimed and desired to be secured by letters patent is as follows:

1. A composite panel suitable for use in furniture manufacture, said panel having a length, a width and a depth, and comprising:

a) a first honeycomb layer of a length and width approximately equal to the length and width of said panel;

b) a structural plywood layer of a length and width approximately equal to the length and width of said panel;

c) an adhesive layer applied between a first side of said first honeycomb layer and a first side of said plywood layer;

d) a second honeycomb layer of a length and width approximately equal to the length and width of said panel;

e) a second adhesive layer applied between a first side of said second honeycomb layer and a second side of said plywood layer;

f) a veneer of decorative material attached to a second side of said first honeycomb layer, said veneer of decorative material having a length and width approximately equal to the length and width of said panel;

g) a veneer of protective material attached to a second side of said second honeycomb layer, said veneer of protective material having a length and width approximately equal to the length and width of said panel;

h) said plywood and honeycomb layers and said veneers having generally flush edges;

i) a slot formed in said plywood layer and open at the edge thereof;

j) a layer of decorative edging material with a T-shaped cross-sectional configuration including a protruding tang inserted into and captured within the plywood layer slot; and k) said first and second honeycomb layers having substantially equal thicknesses whereby said composite panel has a cross-sectional configuration which is substantially symmetrical with respect to said plywood layer thereof.

2. A composite panel as in claim 1, wherein said layer of decorative edging material is attached to exposed edges of said plywood and honeycomb layers by an adhesive.

3. A composite panel suitable for use in furniture manufacture, said panel having a length, a width and a depth, and comprising:

a) a first honeycomb layer of a length and width approximately equal to the length and width of said panel;

b) a first structural plywood layer of a length and width approximately equal to the length and width of said panel;

c) an adhesive layer applied between a first side of said first honeycomb layer and a first side of said first plywood layer;

d) a second structural plywood layer of a length and width approximately equal to the length and width of said panel;

e) a second adhesive layer applied between a first side of said second plywood layer and a second side of said first honeycomb layer;

f) a veneer of decorative material attached to a second side of said first plywood layer, said veneer of decorative material having a length and width approximately equal to the length and width of said panel;

g) a veneer of protective material attached to a second side of said second plywood layer, said veneer of protective material having a length and width approximately equal to the length and width of said panel;

h) said first and second plywood layers having substantially equal thicknesses and cumulatively comprising more than a third of the total thickness of said composite panel;

i) said plywood and honeycomb layers and said veneers having generally flush edges; and j) a layer of decorative edging material attached to said edges of said plywood and honeycomb layers by an adhesive.

* * * * *